United States Patent
Guha (10) Patent No.: US 7,924,296 B2
(45) Date of Patent: Apr. 12, 2011

(54) SYSTEM AND METHOD FOR DMA CONTROLLED IMAGE PROCESSING

(75) Inventor: Rabindra Guha, Stittsville (CA)

(73) Assignee: Mtekvision Co., Ltd., Seoul (KR)

( * ) Notice: Subject to any disclaimer, the term of this patent is extended or adjusted under 35 U.S.C. 154(b) by 915 days.

(21) Appl. No.: 11/677,033

(22) Filed: Feb. 20, 2007

(65) Prior Publication Data

US 2008/0198170 A1   Aug. 21, 2008

(51) Int. Cl.
*G09G 5/39* (2006.01)
*G09G 5/00* (2006.01)
*G06F 13/00* (2006.01)

(52) U.S. Cl. ......... 345/629; 345/532; 345/536; 345/537

(58) Field of Classification Search ............ 345/629, 345/532, 536, 537; 710/22–28, 308–309
See application file for complete search history.

(56) References Cited

U.S. PATENT DOCUMENTS

| | | | |
|---|---|---|---|
| 5,742,796 A | 4/1998 | Huxley | |
| 5,875,351 A | 2/1999 | Riley | |
| 6,466,226 B1 | 10/2002 | Watson et al. | |
| 6,573,846 B1 * | 6/2003 | Trivedi et al. | 341/67 |
| 6,853,385 B1 | 2/2005 | MacInnis et al. | |
| 6,927,777 B2 | 8/2005 | Kitsutaka | |
| 6,944,358 B2 * | 9/2005 | Morimoto et al. | 382/304 |
| 6,954,818 B2 | 10/2005 | Kent | |
| 7,042,463 B2 | 5/2006 | Kitsutaka | |
| 2005/0223136 A1 | 10/2005 | Tanaka et al. | |
| 2005/0270297 A1 | 12/2005 | Munday et al. | |
| 2006/0092320 A1 * | 5/2006 | Nickerson et al. | 348/441 |
| 2006/0125831 A1 | 6/2006 | Lee et al. | |

* cited by examiner

*Primary Examiner* — Hau H Nguyen
(74) *Attorney, Agent, or Firm* — Birch, Stewart, Kolasch & Birch, LLP (57) ABSTRACT

A system for processing image data from a plurality of images is disclosed. The invention involves alpha blending of two images of different resolution and color space utilizing shared logic for multiple image streams and without display storage frame buffer. The invention utilizes Direct Memory Access (DMA) fetching module for fetching image data from source images or from source image memory areas and transferring the data to another memory area without having to go through a central processing unit or display storage frame buffer. The DMAs are configured with direct registers or memory mapped descriptors as to the location of the source data. The DMA channels of the DMA module will fetch a portion of the source images (tiling) utilizing a link list or series of descriptors in a certain fetching order. The DMA modules can perform the alpha blending on the fetched image data.

37 Claims, 4 Drawing Sheets

SYSTEM AND METHOD FOR DMA CONTROLLED IMAGE PROCESSING

BACKGROUND OF THE INVENTION

1. Field of the Invention

The present invention is related to a system and method for processing an image, more specifically to a DMA controlled image processing system.

2. Background Art

The image processing system typically interfaces to the display controller through a "frame buffer" of special two-port memory, which can be written to randomly by the graphics processing system, but also provides the synchronous data output needed by the video output driver. (Digital-to-analog conversion is also provided after the frame buffer.) Such a frame buffer is usually implemented using VRAM memory chips (or sometimes with DRAM and special DRAM controllers). This interface relieves the graphics-processing system of most of the burden of synchronization for video output. Nevertheless, the amounts of data which must be moved around are very sizable, and the computational and data-transfer burden of placing the correct data into the frame buffer can still be very large. Even if the computational operations required are quite simple, they must be performed repeatedly on a large number of data points. If blending is desired, additional bits (e.g. another 8 bits per pixel) will be required to store an "alpha" or transparency value for each pixel.

Some image processor requires an image display engine to render a variety of images, each having pixel data in a variety of formats. A number of alternative data formats may be utilized, such as indexed, 16 bit, 24 bit, 32 bit, RGB, YCbCr, 4:2:2, and so forth. When two images in different formats is alpha blended, scaling the original images to a desired output resolution may be required. These scaled images are stored in external buffer memory. These converted scaled images may be then color space converted to the output color format. If rotation is required of either image, that intermediate images also needs to be created and stored before the alpha blending process. Thus, alpha blending of two images of different resolution, different orientation and color space requires external storage buffer. The memory buffers can be configured as frame buffers or line buffers.

However, in the conventional image display engine for alpha blending, alpha blend source images must be same size as destination output and source images must be same color space. Further, the conventional image display engine for alpha blending does not support YUV42x Planar format seamlessly. Moreover, temporary frame buffer to hold intermediate data needs more running time and power consumption.

Accordingly, a need exists for an image processing system and method for processing multiple image data which avoids these and other problems of known systems and methods. The present invention solves these problems to provide alpha blending of two images of different resolution, different orientation and color space utilizing shared logic for multiple image streams and without display storage frame buffer and overcoming a number of deficiencies in the prior image processing systems.

SUMMARY OF THE INVENTION

It is a general object of the present invention to provide a DMA controlled image processing system in which the above-described disadvantage is eliminated.

A more specific object of the present invention is to provide a DMA controlled image processing system which can perform the alpha blending on the fetched image data. The invention involves alpha blending of two images of different resolution, different orientation and color space utilizing shared logic for multiple image streams and without display storage frame buffer. The invention utilizes Direct Memory Access (DMA) fetching module for fetching image data from source images or from source image memory areas and transferring the data to another memory area without having to go through a central processing unit or display storage frame buffer utilizing a typical programmed Input/Output (PIO) data transfer display storage frame buffer. The DMA fetching module 101 is configured with direct registers or memory mapped descriptors as to the location of the source data. The DMA channels of the DMA module will fetch a portion of the source images (tiling) utilizing a link list or series of descriptors in a certain fetching order.

An aspect of the present invention features a system for direct memory access (DMA) controlled image processing having at least one processor and a DMA fetching module which is configured to fetch image data from a plurality of image sources and includes a DMA master and a plurality of DMA channels. The plurality of DMA channels fetch a plurality of image tile of pixel data in a certain fetching order and each of the DMA channels fetches the image tiles from one of the plurality of image sources. The DMA master controls the fetching. The processor is coupled with the DMA fetching module and generates a combined image for display. The DMA channels fetch the image tiles of pixel data by using DMA descriptors. One of the at least one processor performs alpha blending on the fetched image data. A color space transformation module can be coupled to the DMA fetching module. The color space transformation module converts an input format image color space of the fetched image data to an output format image color space. A horizontal scaling module can be coupled to the DMA fetching module. The horizontal scaling module performs horizontal scaling of the fetched image data. A gamma correction module is coupled to the DMA fetching module. The gamma correction module performs a gamma correction operation. One of the fetching orders allows the DMA fetching module to transfer the image data in a rotated manner. After a line of an image data fetched, a vertical logic for each of the image sources determines the next line of its image to be fetched for vertical scaling. A first-in-first-out (FIFO) is configured to temporarily store the fetched image data before being transferred to the processor. A register provides location of the image sources and output image format. An arbiter performs prioritization and arbitration among the plurality of DMA channels.

Another aspect of the present invention features a system for processing image data from a plurality of images, having a register, a DMA fetching module and a display blender. The register provides descriptors as to location of the plurality of images. The DMA fetching module is coupled to the register and to fetch image data from the plurality of images. The DMA fetching module includes a DMA master and a plurality of DMA channels. The plurality of DMA channels fetch a plurality of image tiles of pixel data in a certain fetching order and each of the DMA channels fetch the image tiles from one of the plurality of images. The DMA master controls the fetching. The display blender blends the plurality of images into a single combined image to be displayed.

Another aspect of the present invention features a method for processing image data from a plurality of images, comprising the steps of: transferring each of the plurality of images to each of a plurality of DMA channels; fetching a plurality of image tiles of pixel data in a certain fetching order, each of the DMA channels fetching the image tiles from one of the plurality of images; and blending the fetched image tiles to generate a combined image.

Another aspect of the present invention features a method for processing image data from a plurality of images, comprising the steps of: storing at least one image source in a memory; configuring a plurality of descriptors as to location of said source image and output image format for said source image; reading a link list stored in the memory utilizing a DMA master, said link list including the plurality of descriptors; reading a tile of the source image data based on the descriptors, the tile of the source image being a portion of the source image data; fetching the tile of the source image in a certain fetching order by utilizing a plurality of DMA channels; image processing the stored tile of the source image data; and displaying the image processed tile of the source image data. The descriptors define a certain fetching order where each descriptor points to a tile of an image that is to be fetched.

BRIEF DESCRIPTION OF THE DRAWINGS

These and other features, aspects and advantages of the present invention will become better understood with regard to the following description, appended claims and accompanying drawings where:

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein. Like numbers utilized throughout the various Figures designate like or similar parts.

DESCRIPTION OF THE EMBODIMENTS

Preferred embodiments of the present invention will be described below with reference to the accompanying drawings.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

As used in this application, the terms "module" and "unit" are intended to refer to, but is not limited to, a software or hardware component, which performs certain tasks. A module or component may advantageously be configured to reside on the addressable storage medium and configured to execute on one or more processors. Thus, a module or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 1:
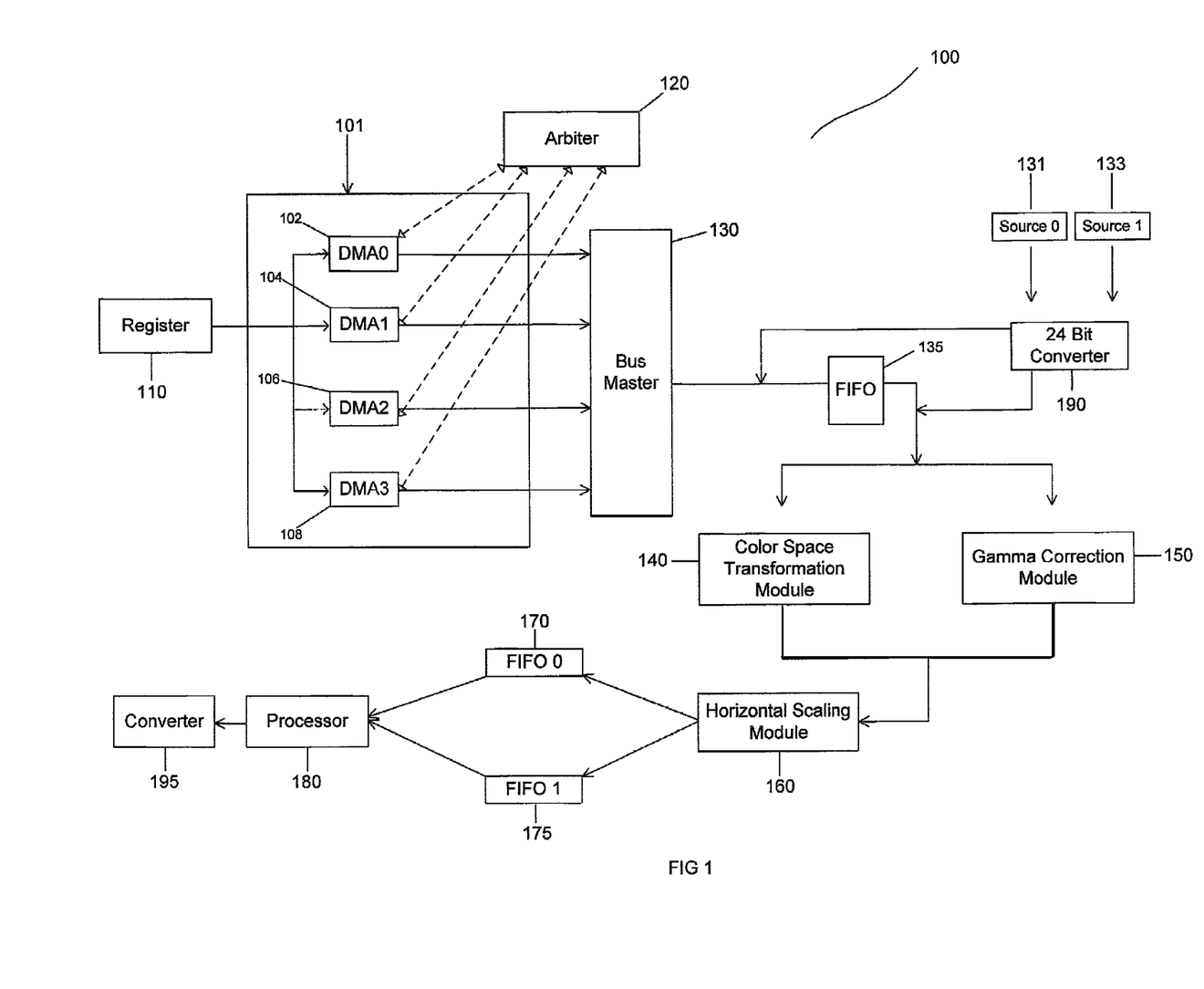
FIG. 1 is a functional block diagram of a system for direct memory access (DMA) controlled image processing in accordance with an embodiment of the present invention.

FIG. 1 is an example showing the operation of a system for DMA controlled image processing in accordance with an embodiment of the present invention. The DMA controlled image processing system 100 comprises a Direct Memory Access (DMA) fetching module 101, a register 110, a color space transformation module 140, gamma correction module 150, a horizontal scaling module 160, first-in-first-out (FIFO) 170 & 175, and image processor 180 and another format converter 195. The DMA fetching module 101 fetches image data from a plurality of image sources. The DMA fetching module 101 includes a DMA master 102 and a plurality of DMA channels 104, 106, 108. The DMA channels 104, 106, 108 fetch a plurality of image tiles of pixel data in a certain fetching order. Each of the DMA channels 104, 106, 108 fetches the image tiles from one of the plurality of image sources. The DMA master 102 controls the fetching procedure.

In one embodiment, software configures either DMA Direct Registers or a memory mapped descriptor or chain of descriptors as to location of Source 0 131 (RGBxxx, YUV444, YUV422Stream or YUV42xPlanar), Source 1 133 (RGBxxx, YUV444 or YUV422Stream) and Output image format. Additionally, the associated the color space transformation module 140 and Horizontal & Vertical scaling module 160 are configured for each Source image. The Gamma correction module 150 is configured for the desired display type.

The DMA controlled image processing system 100 includes the register 110. The register 110 has an associated address tag, giving its offset from the base of the register file. The most straightforward way to load a value into a register is to write the data to its mapped address.

The DMA master 102 controls the fetching of descriptors stored in memory and processing the descriptor chains. The DMA master 102 controls a link list of the DMA descriptors in accordance with an embodiment of the present invention.

The link list of the DMA descriptors is stored in memory. Upon processing the next DMA descriptor referenced in the next descriptor address register, the DMA fetching module 101 causes a number of image tiles to be read from memory. The DMA fetching module 101 fetches image data from source images or from source image memory areas and transfers the image tiles to the image processor 180 for alpha blending without having to go through a storage frame buffer. The DMA fetching module 101 is configured with direct registers or memory mapped descriptors as to the location of the source data. The DMA channels 104, 106, 108 of the DMA fetching module 101 will fetch a portion of the source images (tiling) utilizing a link list or series of descriptors in a certain fetching order. The system for DMA controlled image processing 100 can perform the alpha blending on the fetched image data.

DMA1 104 is used to fetch Source 0 image data. For YUV42x Planar format, DMA1 will fetch Y Planar data, while DMA3 108 will fetch UV Planar data. DMA2 106 will fetch Source 1 image data. Additionally, DMA0, the DMA master 102 will be used for Pattern Fill and Solid Fill operations. DMA 1, 2 and 3 104, 106, 108 have an embedded scaler/interpolator that is used to either re-fetch or skip particular lines of an image. This logic performs the independent vertical scaling of each image. Additionally, the DMA fetching modules 104, 106 & 108 have the ability to fetch image data in a rotated fashion. Optimized bus transactions are performed by selecting Burst transaction based upon 1K Memory boundary, Input image format (bytes per pixel) and number of pixels remaining within a line. The bus transactions are only initiated if downstream FIFO's have the ability to store processed data.

The DMA controlled image processing system 100 also includes the arbiter 120. The arbiter 120 performs prioritization and arbitration between the DMA channels 104, 106, 108 sent to the processor 180. The arbiter 120 grants to either DMA1/3 104, 108 or DMA2 106 provides the context switch used in downstream logic. The arbiter 120 can only change grant when the data of an entire bus fetch for either Source 0 or Source 1 has been processed by the color space transformation module 140, the horizontal scaling module 160, such as a Horizontal Bresenham, and stored into FIFO 0 170 (Source 0) or FIFO 1 175 (Source 1). A 24 bit converter 190 converts the Source0 131 and Source1 133 to a 24-bit representation of its Input format (RGXxxx→RGB24, YUV4xx→YUV444).

A DMA FIFO 135 may temporarily hold one tile of the fetched data from either DMA1 104, DMA2 106, or DMA3 108 before the data is sent to either the color space transformation module 140 or the Gamma Correction module 150.

The color space transformation module 140 is configured to convert the input image color space to the output color space. Thus if the output color space is RGB and Image 0 is YUV and Image 1 is RGB, color space transformation module 140 is configured to perform YUV→RGB for Image 0 and RGB→RGB for Image1.

The location of the Gamma Correction module 150 within the data flow is dynamic, to ensure its input color format is RGB. The Horizontal Bresenham interpolator, maintains state for Source 0 131 and Source 1 133 scaling. This enables independent horizontal scaling of Image 0 and 1. The output of the Horizontal Bresenham interpolator module 160 is a weighted value between the last and latest input. The End-Of-Line indication from DMA1 and DMA2 will reset the respective Bresenham state for Source 0 and Source 1. Context switching between Image 0 and Image1 state is controlled by the DMA arbiter 120. Scaled 24-bit data is then inserted into the respective FIFO0 170 and FIFO1 175.

The DMA controlled image processing system 100 includes an image processor 180. The image processor 180 can perform either No Operation, Color Expansion, Alpha blending or Raster Ops (ROP). Alpha blending and ROP require two image sources. Alpha blending configuration is part of the descriptor programming. Up to 3 Chroma Keys (RGB24/YUV444), each with programmable bit masks and alpha blend factor, along with a default alpha blend factor, will search each Image 1 pixel, determine which alpha blend factor to process that pixel with its respective Source 0 pixel. The blended pixel is then passed on to the Conv2OutFormat converter 195. ROP performs logical operation upon Source 0 and Source 1 pixel. The modified pixel is then passed on to the Conv2OutFormat converter 195. No Operation simply passes the RGB24/YUV444 pixel in FIFO 0 to the Conv2OutFormat converter 195. The Conv2OutFormat 195 will convert the RGB24/YUV444 to different flavors of RGB or YUV422Stream (E.g. RGB565 or YUV422Stream). Programming options exist to generate BGRxxx or RGBxxx along with Y0UY1V, Y1VY0U, UY0VY1 or VY1UY0. This data is then passed to either an output FIFO 2 for removal by an external DMA engine or sent directly to another device via a sideband interface.

Figure 2A:
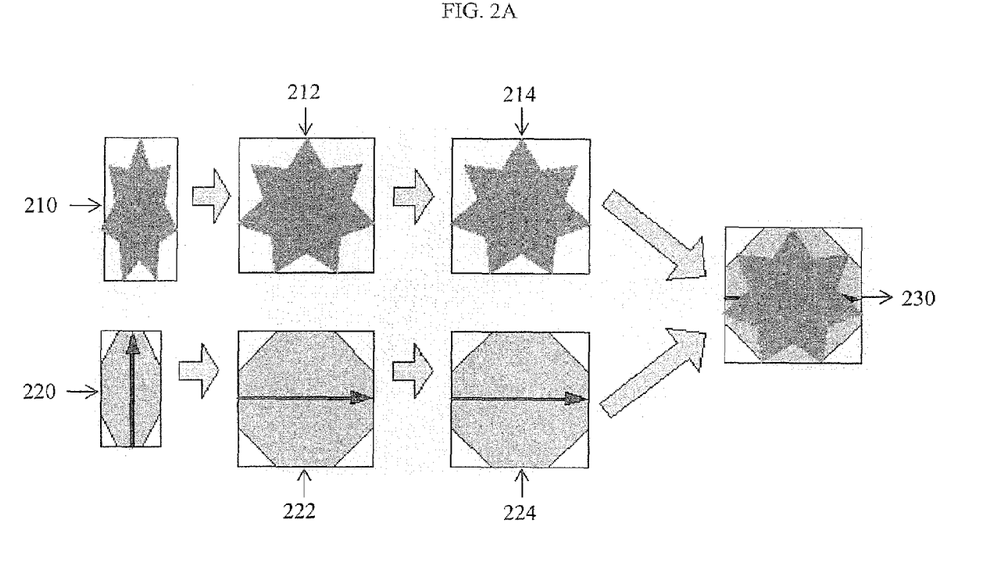
FIG. 2A illustrates a projected image in accordance with an embodiment of the prior art.

Turning to the drawings, FIG. 2A illustrate the projected image according to the prior art. Consider that two images are Alpha blended together. Image 0 210 is a 64x96 RGB565 formatted image, while Image 1 220 is an 80x40 YUV420Planar formatted image. The desired output image 230 is a 112x112 YUV422Stream formatted image.

Prior art would need to scale the original images to the desired output resolution. These scaled Image 0 212 and Image1 222 are stored in a buffer memory. These converted scaled images 212, 222 are then color space converted to the output color format. This means that the scaled Image 0 212 goes from the RGB format to the YUV444 format, while the scaled Image 1 222 goes from the YUV420Planar format to the YUV444 format. These scaled and color converted images 214, 224 are also stored in a buffer memory in the YUV444 format. Finally, the scaled and converted Image 0 214 and the scaled and converted Image 1 224 are Alpha blended together, which outputs the Alpha blended image 230. If rotation is required of either image, that intermediate images needs to be created and stored before the Alpha blending procedure.

Figure 2B:
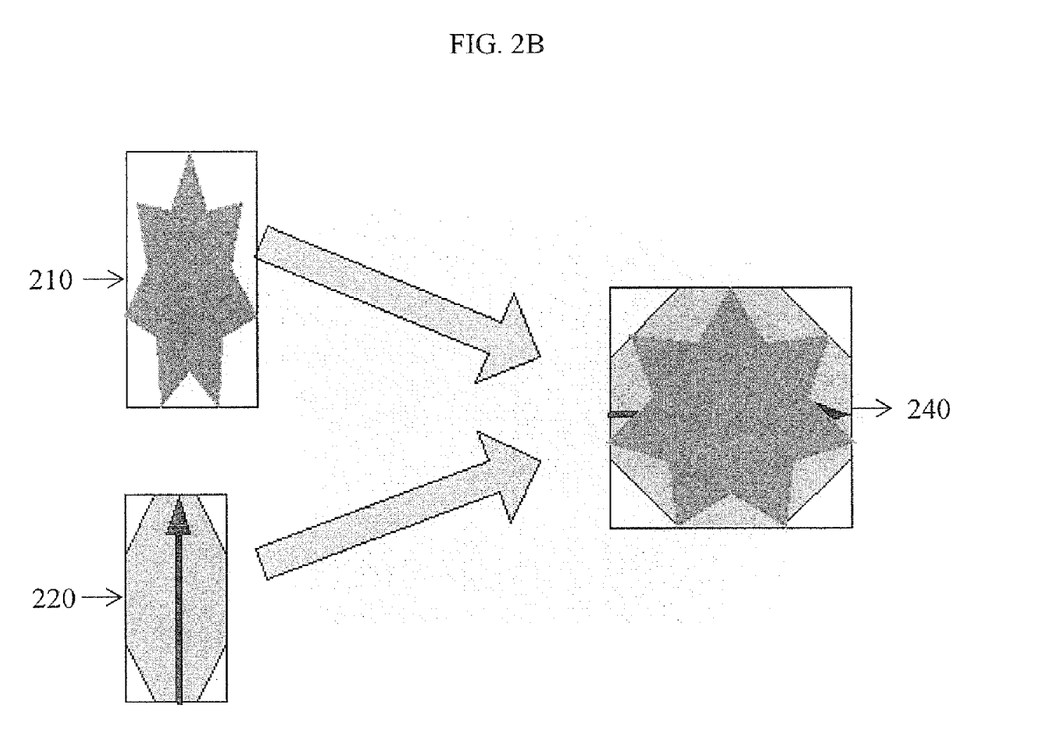
FIG. 2B illustrates a projected image in accordance with an embodiment of the present invention.

The present invention, as seen in FIG. 2B, eliminates the needs to store the intermediate storage of the Image 0 210 and Image 1 220 in the buffer memory. That is the scaled Image 0 212 and the scaled Image 1 222, the scaled and converted Image 0 214 and the scaled and converted Image 1 224, and the rotated Image 0/1 are not required, elimination the read and write transactions associated with the load and store of these images. In this embodiment, the present invention fetches each Image 0 210 and Image 1 220 in a piecemeal fashion. For each Image 0 210 or Image 1 220, a group of pixels from each line is fetched in the order of desired output, in an alternating fashion. The fetch order provides the rotation aspect of the invention. The fetching alternates between Image 0 210 and Image 1 220, fetching groups of pixels for an output line. For each group of pixel fetched, the pixels will be horizontally scaled and color spaced converted and stored in a unique FIFO for each image as 24 bits/pixel (RGB24 or YUV444). The Image0 210 and Image1 220 have individual color space conversion parameters and scaling parameters which are used, depending on which Image is being fetched at that time. After a line of an image is fetched, the vertical scalar logic for each Image 0 210 or Image 1 220 will decide the next line of its image to fetch. This provides the vertical scaling feature of the invention. Finally, FIFO0 and FIFO1 will hold the rotated, scaled and color space converted pixels of each Image 0 210 and Image 1 220 respectively. Alpha blending is then performed and the data provided directly to the LCD device or to an output FIFO, to be transferred to the memory. Alpha blending outputs the alpha blended image 240 which is in YUV444 format.

Figure 3:
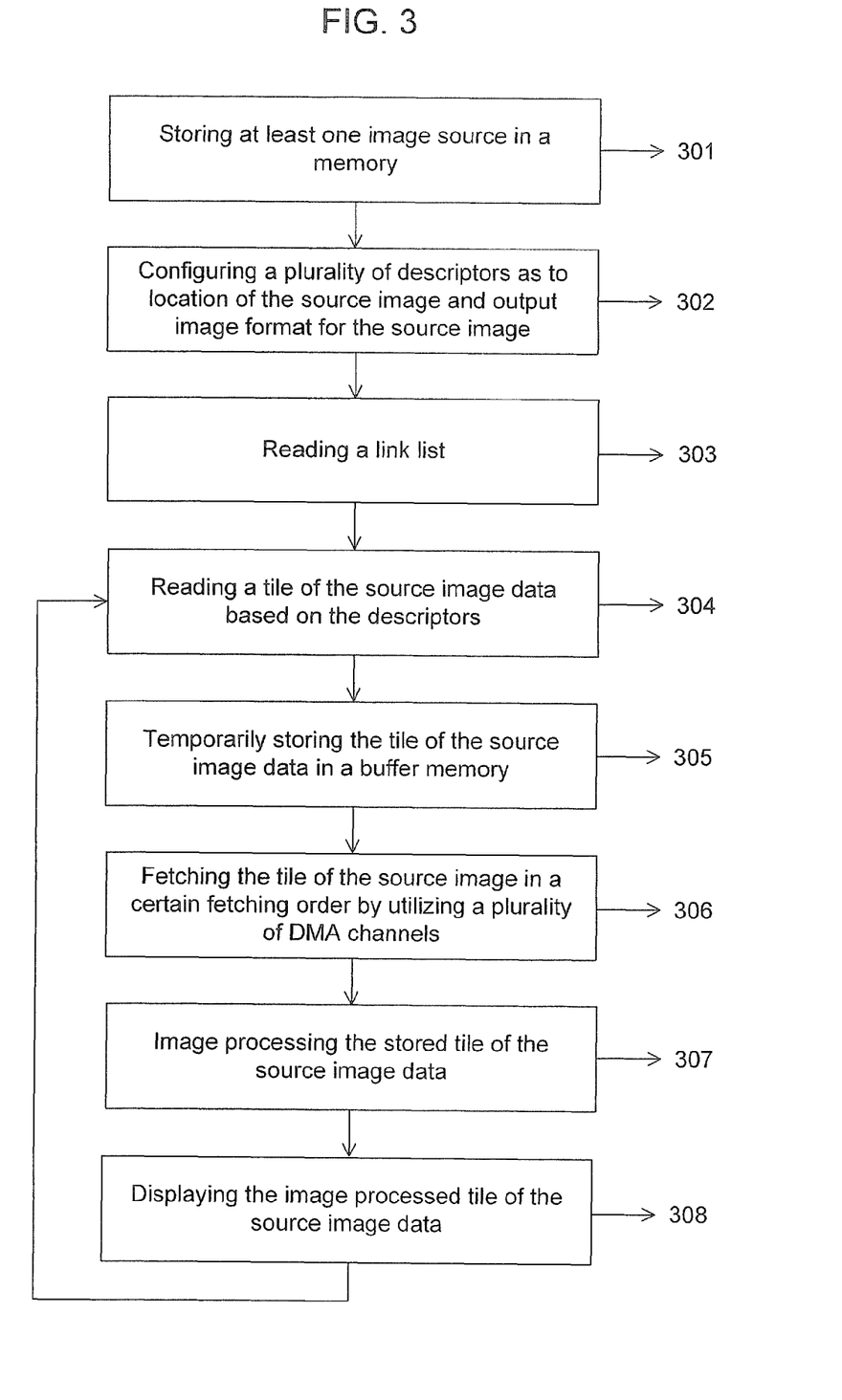
FIG. 3 is a flowchart illustrating a method for processing image data in accordance with an embodiment of the present invention.

The FIG. 3 is a flowchart illustrating a method for processing image data from a plurality of images. In Step 301, the DMA controlled image processing system 100 transfers each of the plurality of images to each of a plurality of DMA channels.

In operation 301, the image sources are stored in a memory. Each source images, such as Source 0 (RGBxxx, YUV444, YUV422Stream or YUV42xPlanar) and Source 1 (RGBxxx, YUV444 or YUV422Stream) can have different data format. One of the image sources may be an image data captured by an image sensor.

In operation 302, software configures either DMA Direct Registers or a memory mapped descriptor or chain of descriptors as to location of Source 0 (RGBxxx, YUV444, YUV422Stream or YUV42xPlanar), Source 1 (RGBxxx, YUV444 or YUV422Stream) and Output image format.

In operation 303, the stored descriptors are read to control each DMA channels in fetching image tiles of each source image. The link list comprises the descriptors. The DMA master 102 controls a link list of the DMA descriptors in accordance with an embodiment of the present invention.

In operation 304, in order to fetch the image tiles, each image tile of the source image data is read based on the descriptors. Then, the image tile can be temporarily stored in a buffer memory. The buffer memory can function as a virtual scratch pad. (Operation 305).

In operation 306, each image tile of the source image is fetched in a certain fetching order by utilizing the plurality of DMA channels. Upon processing the next DMA descriptor referenced in the next descriptor address register, the DMA fetching module 101 causes a number of image tiles to be read from memory. The DMA fetching module 101 fetches image data from source images or from source image memory areas and transfers the image tiles to the image processor 180 for alpha blending without having to go through a storage frame buffer. The DMA channels 104, 106, 108 of the DMA fetching module 101 will fetch a portion of the source images (tiling) utilizing a link list or series of descriptors in a certain fetching order.

In operation 307, various image processing could be performed to process the fetched image tiles. The system for DMA controlled image processing 100 can perform the alpha blending on the fetched image data. DMA1 102 is used to fetch Source 0 image data. For YUV42x Planar format, DMA1 will fetch Y Planar data, while DMA3 108 will fetch UV Planar data. DMA2 106 will fetch Source 1 image data. Additionally, DMA0, the DMA master 102 will be used for Pattern Fill and Solid Fill operations. DMA 1, 2 and 3 104, 106, 108 have an embedded scaler/interpolator that is used to either re-fetch or skip particular lines of an image. This logic performs the independent vertical scaling of each image. Additionally, these DMA fetching module 101 have the ability to fetch image data in a rotated fashion. Optimized bus transactions are performed by selecting Burst transaction based upon 1K Memory boundary, Input image format (bytes per pixel) and number of pixels remaining within a line. The bus transactions are only initiated if downstream FIFO's have the ability to store processed data.

In operation 308, a display device displays the image processed image tiles of the source image data.

In another embodiment, the DMA fetching module 101 fetches a plurality of image tiles of pixel data in a certain fetching order. Each of the DMA channels 104, 106, 108 fetches the image tiles from one of the plurality of images. Then, the image processor 180 blends the fetched image tiles to generate a combined image.

The method to process/implement Alpha Blend or any other type of image processing that minimizes memory data transfer, power consumption and utilizes one set of hardware units for different image formats. Performing independent image Color Space conversion, independent image rotation, independent Image re-sizing (Horizontally & Vertically), independent image Gamma Correction and Image Processing, with minimal storage elements, allows for minimal power consumption and low latency.

Although a preferred embodiment of the present invention has been described, anyone of ordinary skill in the art to which the invention pertains should be able to understand that a very large number of permutations are possible without departing the spirit and scope of the present invention, which shall only be defined by the claims appended below.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A system for direct memory access (DMA) controlled image processing, the system comprising:
    a DMA fetching module, the DMA fetching module being configured to fetch image data from a plurality of image sources, the DMA fetching module including a DMA master and a plurality of DMA channels, the plurality of DMA channels fetching a plurality of image tiles of pixel data in a certain fetching order, each of the plurality of DMA channels fetching the plurality of image tiles from at least one of the plurality of image sources, the DMA master controlling the fetching; and
    at least one processor operatively coupled with the DMA fetching module, the at least one processor generating a combined image for display, the combined image including images from the plurality of image sources,
    wherein the plurality of image tiles are generated when the plurality of DMA channels perform the fetching, and
    wherein the plurality of image sources generate a plurality of the image data to be fetched, that are of different resolution, orientation, and/or color space.

2. The system of claim 1, wherein the plurality of DMA channels fetch the plurality of image tiles of pixel data by using DMA descriptors.

3. The system of claim 1, wherein the at least one processor performs alpha blending on the fetched image data.

4. The system of claim 1, further comprising a color space transformation module coupled to the DMA fetching module, the color space transformation module converting an input format image color space of the fetched image data to an output format image color space.

5. The system of claim 1, further comprising a horizontal scaling module coupled to the DMA fetching module, the horizontal scaling module performing horizontal scaling of the fetched image data.

6. The system of claim 1, further comprising a gamma correction module coupled to the DMA fetching module, the gamma correction module performing a gamma correction operation on the fetched image data.

7. The system of claim 1, wherein, among a plurality of fetch orders, one of the plurality of fetching orders allows the DMA fetching module to transfer the fetched image data in a rotated manner.

8. The system of claim 1, wherein after a line of an image is fetched, a vertical logic for each of the plurality of image sources determines a next line of the image to be fetched for vertical scaling.

9. The system of claim 1, further comprising a first-in-first-out (FIFO), the FIFO being configured to temporarily store the fetched image data before being transferred to the at least one processor.

10. The system of claim 1, further comprising a register, the register providing locations of the plurality of image sources and an output image format.

11. The system of claim 1, further comprising an arbiter, the arbiter performing prioritization and arbitration among the plurality of DMA channels.

12. A system for processing image data from a plurality of images, the system comprising:
    a register, the register providing descriptors as to locations of the plurality of images;
    a DMA fetching module, the DMA fetching module being coupled to the register, the DMA fetching module being configured to fetch the image data from the plurality of images, the DMA fetching module including a DMA master and a plurality of DMA channels, the plurality of DMA channels fetching image tiles of pixel data in a certain fetching order, each of the plurality of DMA channels fetching at least one of the image tiles from at least one of the plurality of images, the DMA master controlling the fetching; and
    a display blender, the display blender blending the plurality of images into a single combined image to be displayed,
    wherein the image tiles are generated from the at least one of the plurality images when the plurality of DMA channels perform the fetching, and
    wherein the plurality of image sources generate a plurality of the image data to be fetched, that are of different resolution, orientation, and/or color space.

13. The system of claim 12, wherein the display blender performs alpha blending on the fetched image data.

14. The system of claim 12, further comprising a color space transformation module coupled to the DMA fetching module, the color space transformation module converting an input format image color space of the fetched image data to an output format image color space.

15. The system of claim 12, further comprising a horizontal scaling module coupled to the DMA fetching module, the horizontal scaling module performing horizontal scaling of the fetched image data.

16. The system of claim 12, further comprising a gamma correction module coupled to the DMA fetching module, the gamma correction module performing a gamma correction operation on the fetched image data.

17. The system of claim 12, wherein, among a plurality of fetching orders, one of the plurality of fetching orders allows the DMA fetching module to transfer the fetched image data in a rotated manner.

18. The system of claim 12, wherein after a line of an image is fetched, a vertical logic for each of image sources determines a next line of the image to be fetched for vertical scaling.

19. The system of claim 12, further comprising a first-in-first-out (FIFO), the FIFO being configured to temporarily store the fetched image data before being transferred to the display blender.

20. The system of claim 12, further comprising an arbiter, the arbiter performing prioritization and arbitration among the plurality of DMA channels.

21. A method for processing image data from a plurality of images, the method comprising:
    transferring each of a plurality of images to one of a plurality of DMA channels;
    fetching a plurality of image tiles of pixel data in a certain fetching order by utilizing each of the plurality of DMA channels to fetch the plurality of image tiles from at least one of the plurality of images, wherein the plurality of image tiles are generated from the at least one of the plurality images when the plurality of DMA channels perform the fetching; and
    blending the fetched plurality of image tiles to generate a combined image,
    wherein the plurality of images are of different resolution, orientation, and/or color space.

22. The method of claim 21, wherein the plurality of image tiles of pixel data are fetched by using DMA descriptors.

23. The method of claim 21, wherein the step of blending performs alpha blending on the fetched plurality of image tiles.

24. The method of claim 21, further comprising converting an input format image color space of the fetched plurality of image tiles to an output format image color space.

25. The method of claim 21, further comprising scaling the fetched plurality of image tiles.

26. The method of claim 21, wherein, among a plurality of fetching orders, one of the plurality of fetching orders allows transfer of the fetched plurality of image tiles in a rotated manner.

27. The method of claim 21, wherein after a line of an image is fetched, a vertical logic for each of image sources determines a next line of the image to be fetched for vertical scaling.

28. The method of claim 21, further comprising temporarily storing the fetched plurality of image tiles in a first-in-first-out (FIFO) before blending the fetched plurality of image tiles to generate the combined image.

29. The method of claim 21, further comprising storing a link list containing a plurality of descriptors defining a certain fetching order where each descriptor points to a tile of an image that is to be fetched.

30. A method for processing image data from a plurality of images, the method comprising:
storing at least one image source data in a memory;
configuring a plurality of descriptors as to a location of the at least one image source data and an output image format for the at least one image source data;
reading a link list stored in the memory utilizing a DMA master, the link list including the plurality of descriptors;
reading a tile of the at least one image source data based on the plurality of descriptors, the tile of the at least one image source data being a portion of the at least one image source data;
fetching the tile of the at least one image source data in a certain fetching order by utilizing a plurality of DMA channels;
image processing the stored tile of the at least one image source data; and
displaying the image processed tile of the at least one image source data,
wherein the tile is generated from the at least one image source data when the reading and the fetching are performed, and
wherein the at least one image source data is of different resolution, orientation, and/or color space from another source data.

31. The method of claim 30, wherein the step of image processing the stored tile of the at least one image source data comprises blending the tile of the at least one image source data to generate a combined image.

32. The method of claim 31, wherein the step of blending performs alpha blending on the fetched tile of the at least one image source data.

33. The method of claim 30, further comprising converting an input format image color space of the tile of the at least one image source data to an output format image color space.

34. The method of claim 30, further comprising scaling the tile of the at least one image source data.

35. The method of claim 30, wherein, among a plurality of fetching orders, one of the fetching orders allows transfer of the tile of the at least one image source data in a rotated manner.

36. The method of claim 30, further comprising temporarily storing the tile of the at least one image source data in a buffer memory.

37. The method of claim 30, wherein the plurality of descriptors define a certain fetching order where each descriptor points to a tile of the at least one image source data that is to be fetched.

* * * * *